United States Patent
Miyazaki et al.

(10) Patent No.: US 10,088,699 B2
(45) Date of Patent: Oct. 2, 2018

(54) OPTICAL MODULATOR

(71) Applicant: Sumitomo Osaka Cement Co., Ltd, Tokyo (JP)

(72) Inventors: Norikazu Miyazaki, Tokyo (JP); Yoichi Hosokawa, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/689,718

(22) Filed: Aug. 29, 2017

(65) Prior Publication Data

US 2018/0059445 A1 Mar. 1, 2018

(30) Foreign Application Priority Data

Aug. 30, 2016 (JP) .................. 2016-168345

(51) Int. Cl.
| | | |
|---|---|---|
| *G02F 1/035* | (2006.01) | |
| *G02F 1/225* | (2006.01) | |
| *G02B 6/12* | (2006.01) | |
| *G02F 1/03* | (2006.01) | |
| *G02B 6/42* | (2006.01) | |
| *G02F 1/21* | (2006.01) | |

(52) U.S. Cl.
CPC .............. *G02F 1/035* (2013.01); *G02B 6/12* (2013.01); *G02B 6/42* (2013.01); *G02F 1/0327* (2013.01); *G02F 1/2252* (2013.01); *G02F 2001/212* (2013.01); *G02F 2201/122* (2013.01)

(58) Field of Classification Search
CPC ...... G02F 1/035; G02F 1/2252; G02F 1/0327; G02B 6/12; G02B 6/42
See application file for complete search history.

(56) References Cited

U.S. PATENT DOCUMENTS

| | | | |
|---|---|---|---|
| 2010/0316326 A1* | 12/2010 | Sugiyama | ............... G02F 1/225 385/3 |
| 2015/0253593 A1 | 9/2015 | Sugiyama | |
| 2016/0025930 A1* | 1/2016 | Hasegawa | ............. G02F 1/3137 385/17 |

FOREIGN PATENT DOCUMENTS

| | | |
|---|---|---|
| JP | 2010286770 A | 12/2010 |
| JP | 2015169798 A | 9/2015 |

* cited by examiner

*Primary Examiner* — Ryan Lepisto
(74) *Attorney, Agent, or Firm* — Taft Stettinius & Hollister LLP

(57) ABSTRACT

Modulation electrodes, bias electrodes, and bias electrodes are disposed in this order in a light wave-travelling direction in an optical modulation region modulating light having a wavelength. On the other hand, in an optical modulation region modulating light having a wavelength, the bias electrodes, the bias electrodes, and the modulation electrodes are disposed in this order in the light wave-travelling direction. That is, an order of the modulation electrodes and the bias electrodes in a longitudinal direction of a substrate is changed for each of the wavelengths.

4 Claims, 5 Drawing Sheets

US 10,088,699 B2

OPTICAL MODULATOR

CROSS-REFERENCE TO RELATED APPLICATIONS

This application claims the benefit of Japanese Patent Application No. 2016-168345 filed Apr. 30, 2016, the disclosure of which is herein incorporated by reference in its entirety.

BACKGROUND OF THE INVENTION

Field of the Invention

The present invention relates to an optical modulator and particularly to a structure of a highly integrated modulator such as a dual-wavelength integration-type modulator.

Description of Related Art

In the progress of an increase in the frequency and capacity of optical communication systems, the performance improvement and an increase in the density of optical modulators that are used in optical communication systems are in progress. In addition, in response to a request for the size reduction of optical modulators, the size reduction of light modulating elements constituting optical modulators is also in progress. However, the performance improvement, an increase in the density and the size reduction of optical modulators are mutually conflicting requirements, and thus there is a demand for efforts for satisfying the above-described requirements at the same time.

Regarding the above-described optical modulators, inventions as described below are proposed.

For example, Japanese Laid-open Patent Publication No. 2010-286770 discloses a structure in which a plurality of DC pins (A) and a plurality of DC pines (B) disposed on an electrode side of the DC pins (A) are provided on FPC and a plurality of wires reaching an electrode from the plurality of DC pins (B) through a side opposite to RF pins is provided.

For example, Japanese Laid-open Patent Publication No. 2015-169798 discloses a structure in which a first signal electrode included in a first optical modulator is disposed on an input side of a substrate and a second signal electrode included in a second optical modulator is disposed on an output side of the substrate.

SUMMARY OF THE INVENTION

In recent years, highly integrated optical modulators such as dual-wavelength integration-type optical modulators have been under development. FIG. 1 illustrates a constitution example of a dual-wavelength integration-type dual polarization-quadrature phase shift keying (DP-QPSK) modulator of the related art. The optical modulator in the drawing has an optical modulation region M1 to which light waves having a wavelength λ1 are input and an optical modulation region M2 to which light waves having a wavelength λ2 are input and is constituted so that the optical modulation region M1 and the optical modulation region M2 operate independently from each other.

Each of the optical modulation region M1 and the optical modulation region M2 includes an optical waveguide 2, control electrodes for controlling light waves propagating through the optical waveguide 2 using control signals, and light-receiving elements 5 for detecting the light waves propagating through the optical waveguide 2 on a substrate 1 having an electro-optic effect. The control electrodes are constituted of modulation electrodes 3 to which radio frequency signals (RF signals), which are a kind of the control signals, are applied, bias electrodes 4a and 4b to which DC signals, which are a kind of the control signals, are applied, and the like.

The optical waveguide 2 in each of the optical modulation regions M1 and M2 forms a structure in which Mach-Zehnder-type waveguides are multiply disposed in a nest form and, correspondingly, a number of the control electrodes (the modulation electrodes 3 and the bias electrodes 4a and 4b) or the light-receiving elements 5 are provided.

In a downstream portion of the optical modulation region M1, a polarization-combining part 6 is disposed, and light waves propagating through output-side arm parts of the Mach-Zehnder-type waveguides, which serve as the main, are combined together in the polarization-combining part 6 and are output to an optical fiber. The above-described fact also applies to the optical modulation region M2. As the polarization-combining part 6, there are polarization-combining parts having a structure in which polarization combination is carried out using space optical systems, polarization-combining parts having a structure in which polarization combination is carried out using optical waveguides, and the like.

As described above, in highly integrated optical modulators, substrates (chips) on which a number of control electrodes or light-receiving elements are disposed are used. Therefore, a necessity for arranging wires (not illustrated) connecting these components intensifies, and there has been a problem in that the sizes of highly integrated modulators increase.

An object of the present invention is to solve the above-described problem, facilitate the arrangement of wires of modulation electrodes on substrates in optical modulators that modulate light waves having different wavelengths independently from one another, and suppress an increase in the sizes of optical modulators. In addition, the object is to shorten wires of modulation electrodes on substrates having a large loss and suppress the deterioration of radio frequency characteristics.

In order to achieve the above-described object, an optical modulator of the present invention has technical features as described below.

(1) An optical modulator including: a first optical modulation region modulating light having a first wavelength and a second optical modulation region modulating light having a second wavelength being formed on a substrate having an electro-optic effect and side by side in a width direction of the substrate, in which each of the optical modulation regions has modulation electrodes and bias electrodes, and an order of the modulation electrodes and the bias electrodes in a longitudinal direction of the substrate is changed for each of the wavelengths.

(2) In the optical modulator according to (1), a direction in which the light having a first wavelength travels in the first optical modulation region and a direction in which the light having a second wavelength travels in the second optical modulation region are opposite to each other.

(3) In the optical modulator according to (1) or (2), the substrate is accommodated in a housing, in the housing, an RF interface for the modulation electrodes and a DC interface for the bias electrodes are provided, and the DC interface, the RF interface, and the other DC interface are arranged on one side surface of the housing in this order.

(4) In the optical modulator according to any one of (1) to (3), a first bias electrode and a second bias electrode are provided as the bias electrodes, and an order of the modulation electrode, the first bias electrode, and the second bias electrode in the longitudinal direction of the substrate is changed for each of the wavelengths.

According to the present invention, it is possible to facilitate the arrangement of wires of modulation electrodes on substrates in optical modulators that modulate light waves having different wavelengths independently from one another and suppress an increase in the sizes of optical modulators. In addition, it is possible to shorten wires of modulation electrodes on substrates having a large loss and suppress the deterioration of radio frequency characteristics.

DETAILED DESCRIPTION OF THE INVENTION

Hereinafter, an optical modulator according to the present invention will be described in detail.

Figure 2:
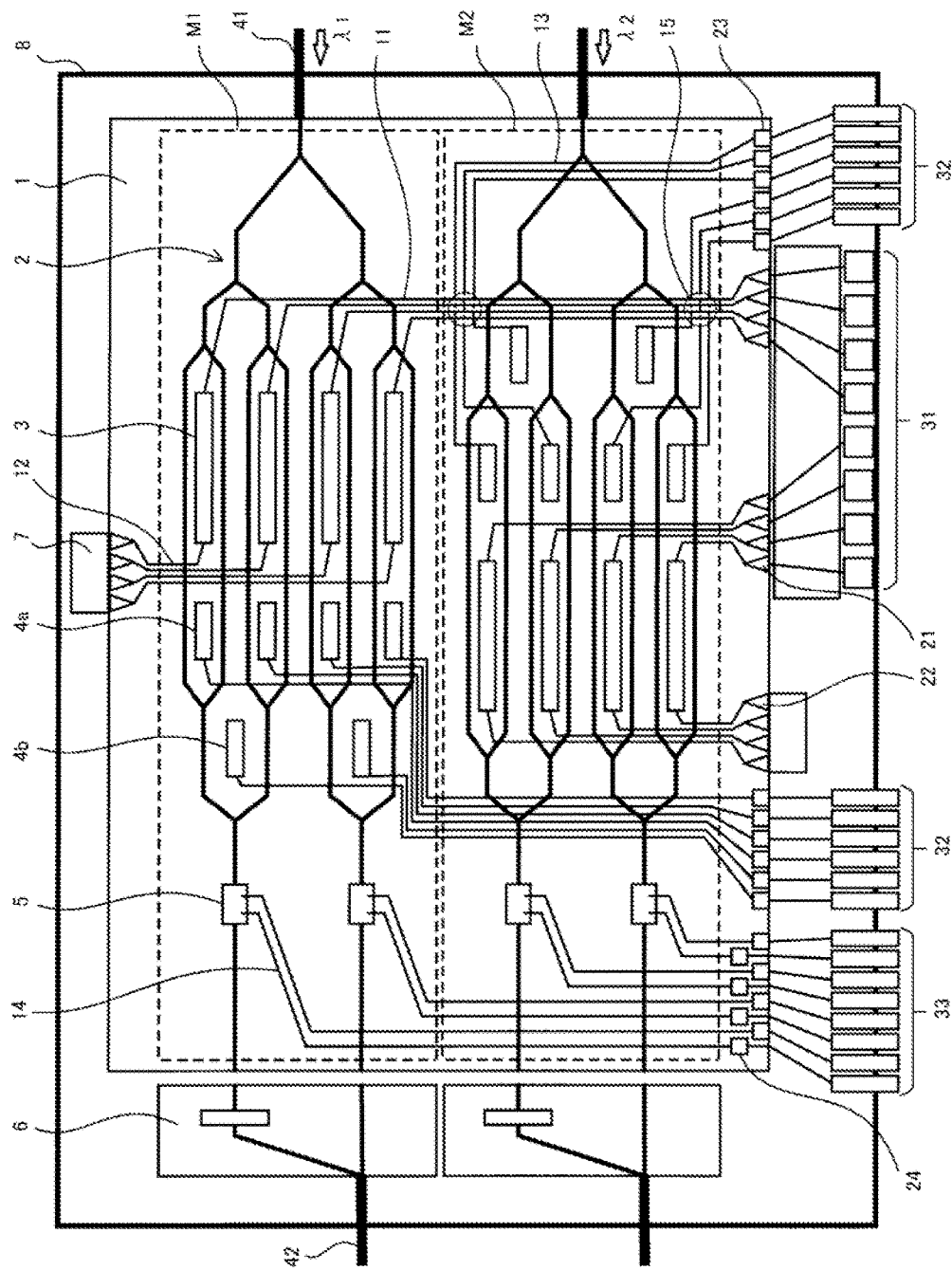
FIG. 2 is a plan view illustrating an optical modulator according to a first example of the present invention.

In the optical modulator according to the present invention, for example, as illustrated in FIG. 2, an optical modulation region M1 modulating light having a wavelength $\lambda 1$ and an optical modulation region M2 modulating light having a wavelength $\lambda 2$ are formed on a substrate 1 having an electro-optic effect and side by side in a width direction of the substrate. Each of the optical modulation regions M1 and M2 has modulation electrodes 3 and bias electrodes 4a and 4b, and the order of the modulation electrodes 3 and the bias electrodes 4a and 4b in a longitudinal direction of the substrate 1 is changed for each of the wavelengths $\lambda 1$ and $\lambda 2$.

The substrate 1 needs to be a substrate in which optical waveguides can be formed such as silica or semiconductors, and particularly, substrates for which a single crystal or the like of anyone of $LiNbO_3$ (lithiumniobate), $LiTaO_3$ (lithium tantalate), or lead zirconate titanate (PLZT) is used, which are substrates having an electro-optic effect, are preferably available.

An optical waveguide 2 that is formed on the substrate 1 is formed by, for example, thermally diffusing a high-refractive index substance such as titanium (Ti) on a $LiNbO_3$ substrate (LN substrate). In addition, rib-type optical waveguides in which grooves are formed on both sides of a portion which serves as an optical waveguide or ridge-type waveguides in which an optical waveguide portion has a protrusion shape are also available. In addition, the present invention can also be applied to optical circuits obtained by attaching and integrating different waveguide substrates such as PLC, on which optical waveguides are formed, together.

In the substrate 1, two optical modulation regions M1 and M2 for phase polarization modulation or quadrature amplitude modulation through which light input from an optical fiber 41 is modulated are formed. The optical modulation region M1 is to modulate light having the wavelength $\lambda 1$, the optical modulation region M2 is to modulate light having the wavelength $\lambda 2$, and these optical modulation regions are formed side by side in the width direction of the substrate.

Each of the optical modulation regions M1 and M2 includes the optical waveguide 2, control electrodes for controlling light waves propagating through the optical waveguide 2 using control signals, and light-receiving elements 5 for detecting the light waves propagating through the optical waveguide 2. Examples of the control electrodes include modulation electrodes 3 to which radio frequency signals (RF signals), which are a kind of the control signals, are applied, ground electrodes surrounding the modulation electrodes (not illustrated), the bias electrodes 4a and 4b to which DC signals, which are a kind of the control signals, are applied, and the like. These control electrodes can be formed using a metal plating method or the like after forming electrode patterns of Ti.Au on the surface of the substrate. Furthermore, it is also possible to provide a buffer layer such as dielectric $SiO_2$ on the surface of the substrate after the formation of the optical waveguide as necessary.

The optical waveguide 2 in each of the optical modulation regions M1 and M2 forms a structure in which Mach-Zehnder-type waveguides are multiply disposed in a nest type and, correspondingly, a number of the control electrodes (the modulation electrodes 3 and the bias electrodes 4a and 4b) or the light-receiving elements 5 are provided. For example, in the nest-type structure, the bias electrodes 4a are provided on the same layer (sub Mach-Zehnder-type waveguide portion) as the modulation electrodes 3, and the bias electrodes 4b are provided on a layer (main Mach-Zehnder-type waveguide portion) immediately above the above-described layer. In addition, in the case of differential bias electrodes, two electrodes are connected from individual action parts.

In this case, there are pins that are not connected or are connected to a GND•case.

In the downstream portion of the optical modulation region M1, a polarization-combining part 6 is disposed, and light waves propagating through output-side arm parts of the Mach-Zehnder-type waveguides, which serve as the main, are combined together in the polarization-combining part 6 and are output to an optical fiber 42. The above-described fact also applies to the optical modulation region M2. As the polarization-combining part 6, there are polarization-combining parts having a structure in which polarization combination is carried out using space optical systems, polarization-combining parts having a structure in which polarization combination is carried out using optical waveguides, and the like.

On the substrate 1, connection pads 21 for RF signal input, connection pads 22 for RF signal output, connection pads 23 for DC signal input, and connection pads 24 for monitor signal output are disposed side by side along a side in the longitudinal direction of the substrate. In addition, a termination substrate 7 for RF signal termination is disposed adjacent to the side in the longitudinal direction of the substrate 1.

The substrate 1 or the termination substrate 7 is accommodated in a housing 8 of the optical modulator. On one side surface of the housing 8, an RF interface 31 for RF signal input, a DC interface 32 for DC signal input, and a monitor PD interface 33 for monitor signal output are provided along a side of the substrate in the longitudinal direction. The RF interface 31 is constituted using, for example, a connector or a flexible printed circuit (FPC). The DC interface 32 and the monitor PD interface 33 are constituted using, for example, pins or FPC.

The modulation electrodes 3 are electrically connected to the RF interface 31 through wires 11 or the connection pads 21 formed on the substrate 1. In addition, the modulation electrodes 3 are electrically connected to the termination substrate 7 through wires 12 or the connection pads 22 formed on the substrate 1. The bias electrodes 4a and 4b are electrically connected to the DC interface 32 through wires 13 or the connection pads 23 formed on the substrate 1. The light-receiving elements 5 are electrically connected to the monitor PD interface 33 through wires 14 or the connection pads 24 formed on the substrate 1. The respective interfaces and the connection pads may be electrically connected to each other through a relay substrate for relaying signals. The wires 13 for the bias electrodes 4a and 4b are disposed so as to straddle the wires 11 in a portion at which the wires intersect the wires 11 for the modulation electrodes 3 (bias electrode-straddling part 15) on the substrate 1. In the bias electrode-straddling part 15, the wires 11 for the modulation electrode 3 are more preferentially disposed than the wires 13 for the bias electrodes 4a and 4b. A structure in which the wires 13 in the bias electrode-straddling part 15 are made to straddle the wires 11 by means of, for example, wire bonding can be provided. Other structures such as structures in which the individual wires are laminated together may also be used.

Figure 1:
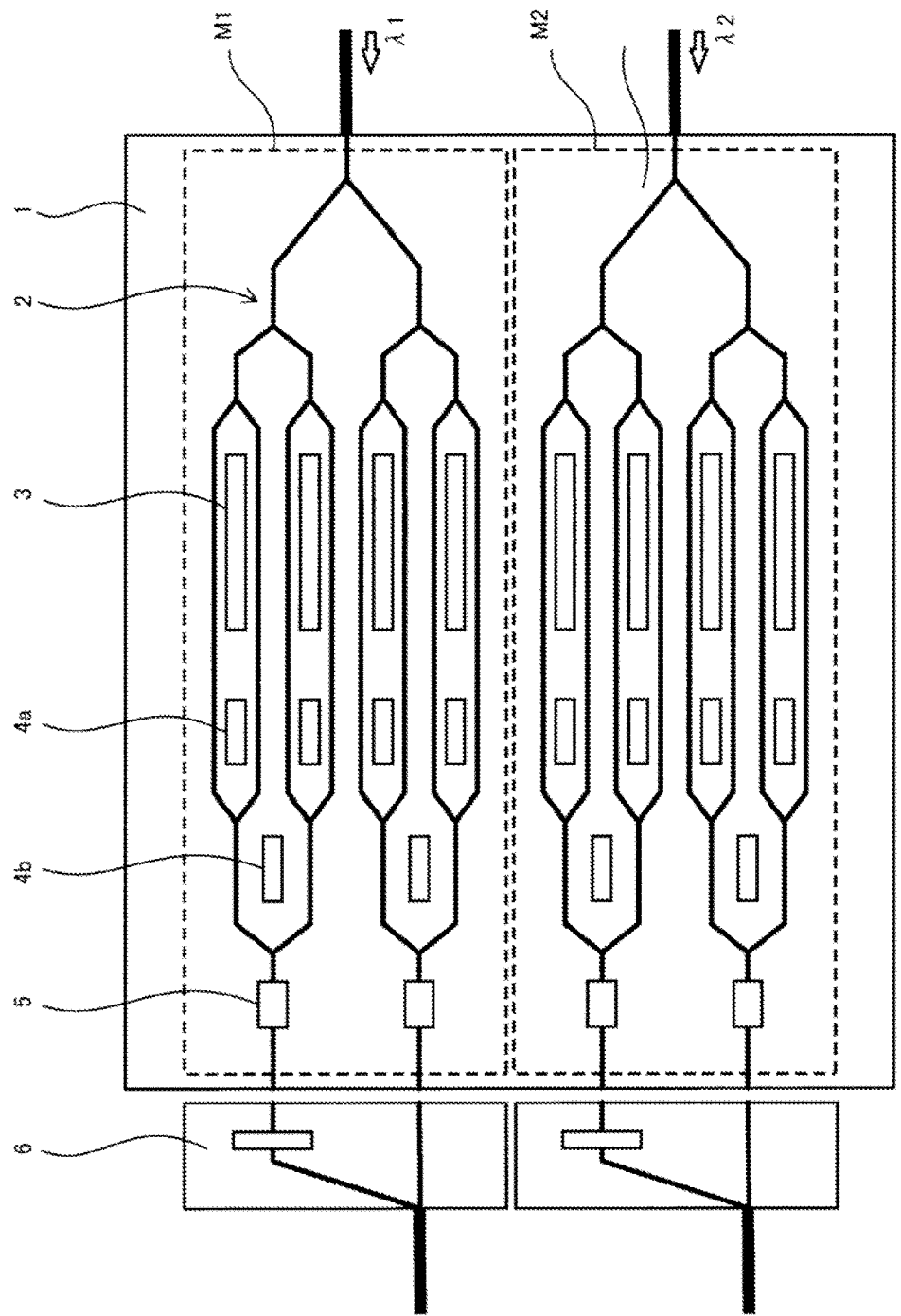
FIG. 1 is a plan view illustrating a constitution example of a dual-wavelength integration-type DP-QPSK modulator of the related art.

A principal feature of the optical modulator according to the present invention is that each of the optical modulation regions has the modulation electrodes and the bias electrodes and the order of the modulation electrodes and the bias electrodes in the longitudinal direction of the substrate is changed for each of wavelengths. The longitudinal direction of the substrate corresponds to a light waves-travelling direction (a direction toward the left side of the drawing in FIG. 1).

Hereinafter, the present invention will be specifically described with reference to examples.

Example 1

FIG. 2 is a plan view illustrating an optical modulator according to a first example of the present invention.

In the optical modulator according to the first example, in the optical modulation region M1 modulating light having the wavelength λ1, the modulation electrodes 3, the bias electrodes 4a, and the bias electrodes 4b are disposed in this order in the light wave-travelling direction. On the other hand, in the optical modulation region M2 modulating light having the wavelength λ2, the bias electrodes 4b, the bias electrodes 4a, and the modulation electrodes 3 are disposed in this order in the light wave-travelling direction. That is, the order of the modulation electrodes 3 and the bias electrodes 4a and 4b in the longitudinal direction of the substrate 1 is changed for each of the wavelengths λ1 and λ2. In other words, in the optical modulation region M1, the bias electrodes 4a and 4b are disposed behind the modulation electrodes 3, and, in the optical modulation region M2, the bias electrodes 4a and 4b are disposed ahead of the modulation electrodes 3. As a whole, a constitution in which some of the bias electrodes 4a and 4b are disposed ahead of the modulation electrodes 3, and the remaining bias electrodes are disposed behind the modulation electrodes is formed. Accordingly, the connection pads 23 for DC signal input, the connection pads 21 for RF signal input, and the connection pads 23 for DC signal input are disposed in a side of the substrate 1 in this order. In addition, on one side surface (a side surface facing the side of the substrate 1) of the housing 8, the DC interface 32, the RF interface 31, and the DC interface 32 are disposed in this order.

When the disposition order of the respective electrodes is changed for each of the wavelengths of light waves (for each of the optical modulation regions) as described above, it is possible to unevenly dispose the modulation electrodes in the longitudinal direction of the substrate for each wavelength, and thus the arrangement of the wires of the modulation electrodes on the substrate becomes easy. Therefore, compared with constitutions in which the disposition order of the modulation electrodes and the bias electrodes is constant, it is possible to simplify and shorten the wires on the substrate, and thus an increase in the size of the optical modulator can be suppressed. In addition, it is possible to shorten the wires of the modulation electrodes on the substrate having a large loss, and thus the deterioration of radio frequency characteristics can be suppressed. Generally, a plurality of modulation signals (radio frequency signals) is output from a single signal processor, and thus, in order to suppress the deterioration of radio frequency characteristics or reduce the sizes of mounting spaces of optical modulators, it is desirable to arrange RF interfaces on one side surface of the housing 8 as in the present example.

In addition, interference prevention means is preferably provided in order to prevent interference between the wires of the modulation electrodes and the wires of the bias electrodes. As the interference prevention means, for example, constitutions in which metal or the like grounded by being connected to the housing of the optical modulator is provided between the wires of the modulation electrodes and the wires of the bias electrodes can be used. In other examples described below as well, similarly, the interference prevention means is preferably provided.

Example 2

Figure 3:
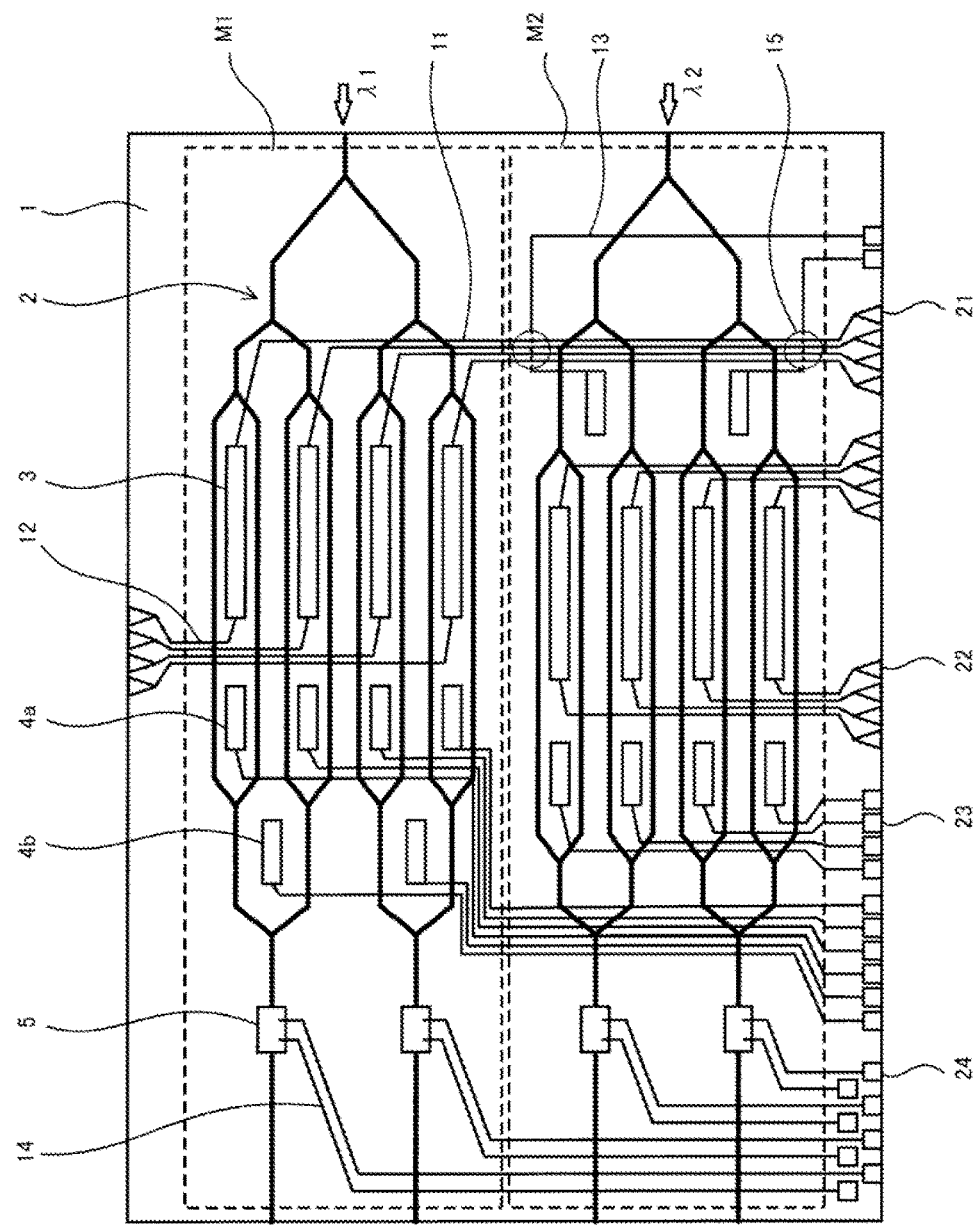
FIG. 3 is a plan view illustrating an optical modulator according to a second example of the present invention.

FIG. 3 is a plan view illustrating an optical modulator according to a second example of the present invention.

In the optical modulator according to the second example, in the optical modulation region M1 modulating light having the wavelength λ1, the modulation electrodes 3, the bias electrodes 4a, and the bias electrodes 4b are disposed in this order in the light wave-travelling direction. On the other hand, in the optical modulation region M2 modulating light having the wavelength λ2, the bias electrodes 4b, the modulation electrodes 3, and the bias electrodes 4a are disposed in this order in the light wave-travelling direction. That is, in the optical modulation region M2, not all of the bias electrodes 4a and 4b are disposed ahead of the modulation electrodes 3, and only the bias electrodes 4b on the upper layer side (main Mach-Zehnder-type waveguide portion) are disposed ahead of the modulation electrodes 3. When the bias electrodes 4a are considered as first bias electrodes, and the bias electrodes 4b are considered as second bias electrodes, the second example forms a constitution in which the modulation electrodes, the first bias electrodes, and the second bias electrodes are changed for each wavelength in the longitudinal direction of the substrate.

In the above-described constitution as well, it is possible to unevenly dispose the modulation electrodes in the longitudinal direction of the substrate for each wavelength, and thus the arrangement of the wires of the modulation electrodes on the substrate becomes easy. Therefore, compared with constitutions in which the disposition order of the modulation electrodes and the bias electrodes is constant, it is possible to simplify and shorten the wires on the substrate, and thus an increase in the size of the optical modulator can be suppressed. In addition, it is possible to shorten the wires of the modulation electrodes on the substrate having a large loss, and thus the deterioration of radio frequency characteristics can be suppressed.

Example 3

Figure 4:
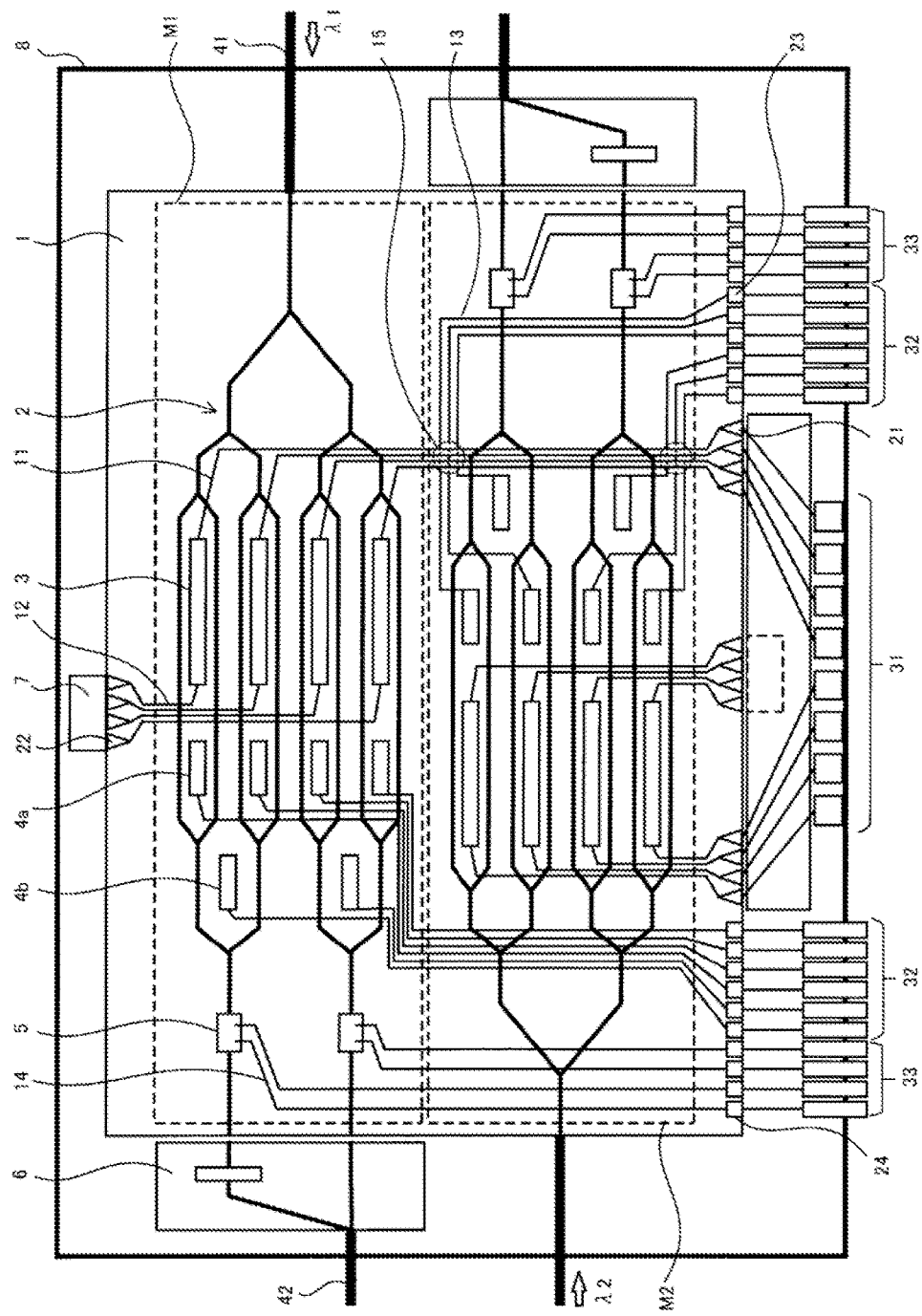
FIG. 4 is a plan view illustrating an optical modulator according to a third example of the present invention.

FIG. 4 is a plan view illustrating an optical modulator according to a third example of the present invention. Hereinafter, the direction in which the respective light waves having the wavelengths $\lambda 1$ and $\lambda 2$ travel in the first and second examples (the direction toward the left side of the drawing) will be considered as the reference direction in the description.

In the first and second examples, the respective light waves having the wavelengths $\lambda 1$ and $\lambda 2$ are input from the optical fiber 41 connected to the upstream side (the right side in the drawing) of the optical modulator in the reference direction, are modulated in the optical modulation regions M1 and M2, and are then output to the optical fiber 42 connected to the downstream side (the left side in the drawing) of the optical modulator in the reference direction.

In contrast, in the third example, the light having the wavelength $\lambda 1$ is input from the optical fiber 41 connected to the upstream side of the optical modulator in the reference direction, is modulated in the optical modulation region M1, and is then output to the optical fiber 42 connected to the downstream side of the optical modulator in the reference direction. On the other hand, the light having the wavelength $\lambda 2$ is input from the optical fiber 41 connected to the downstream side of the optical modulator in the reference direction, is modulated in the optical modulation region M2, and is then output to the optical fiber 42 connected to the upstream side of the optical modulator in the reference direction.

In the optical modulator according to the third example, in the optical modulation region M1 modulating light having the wavelength $\lambda 1$, the modulation electrodes 3, the bias electrodes 4a, and the bias electrodes 4b are disposed in this order in the travelling direction of the light having the wavelength $\lambda 1$ (reference direction). In addition, in the optical modulation region M2 modulating light having the wavelength $\lambda 2$, the modulation electrodes 3, the bias electrodes 4a, and the bias electrodes 4b are disposed in this order in the travelling direction of the light having the wavelength $\lambda 2$ (the direction opposite to the reference direction). That is, the order of the modulation electrodes 3 and the bias electrodes 4a and 4b in the longitudinal direction of the substrate 1 is changed for each of the wavelengths $\lambda 1$ and $\lambda 2$. When seen in one light wave-travelling direction, for example, the reference direction, in the optical modulation region M1, the bias electrodes 4a and 4b are disposed behind the modulation electrodes 3, and, in the optical modulation region M2, the bias electrodes 4a and 4b are disposed ahead of the modulation electrodes 3. As a whole, a constitution in which some of the bias electrodes 4a and 4b are disposed ahead of the modulation electrodes 3, and the remaining bias electrodes are disposed behind the modulation electrodes is formed.

As described above, in the third example, the disposition order of the modulation electrodes 3 and the bias electrodes 4a and 4b in the optical modulation region M1 is opposite to the disposition order of the modulation electrodes 3 and the bias electrodes 4a and 4b in the optical modulation region M2. In addition, the direction in which the light having the wavelength $\lambda 1$ travels in the optical modulation region M1 and the direction in which the light having the wavelength $\lambda 2$ travels in the optical modulation region M2 are set to be opposite to each other.

In the above-described constitution as well, it is possible to unevenly dispose the modulation electrodes in the longitudinal direction of the substrate for each wavelength, and thus the arrangement of the wires of the modulation electrodes on the substrate becomes easy. Therefore, compared with constitutions in which the disposition order of the modulation electrodes and the bias electrodes is constant, it is possible to simplify and shorten the wires on the substrate, and thus an increase in the size of the optical modulator can be suppressed. In addition, it is possible to shorten the wires of the modulation electrodes on the substrate having a large loss, and thus the deterioration of radio frequency characteristics can be suppressed.

Example 4

Figure 5:
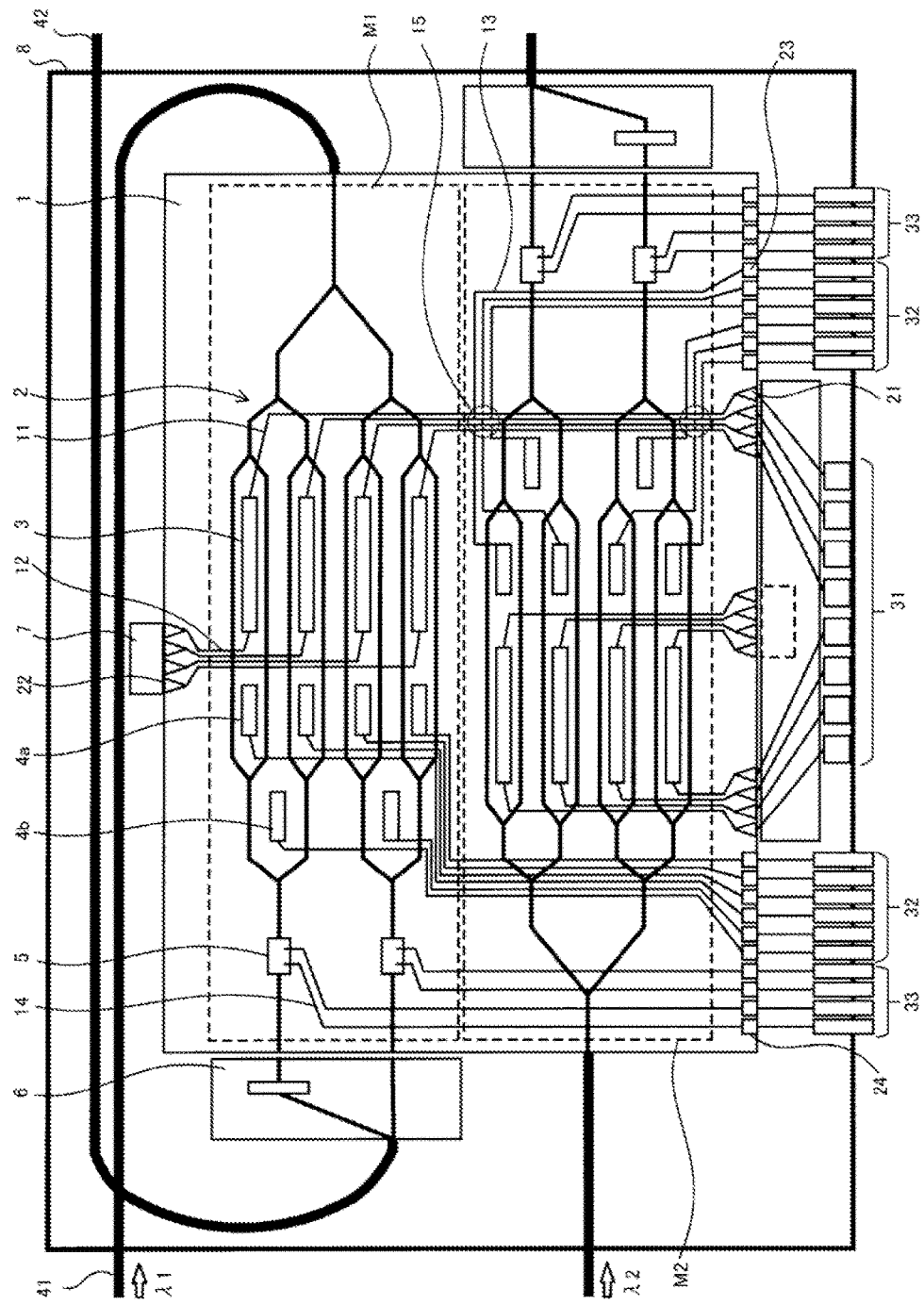
FIG. 5 is a plan view illustrating an optical modulator according to a fourth example of the present invention.

FIG. 5 is a plan view illustrating an optical modulator according to a fourth example of the present invention.

In the optical modulator according to the fourth example, the disposition order of the modulation electrodes 3 or the bias electrodes 4a and 4b on the substrate 1 is set to be the same as that in the third example. The light having the wavelength $\lambda 1$ is input from the optical fiber 41 connected to the upstream side of the optical modulator in the reference direction in the third example; however, in the fourth example, the light is input from the optical fiber 41 connected to the downstream side of the optical modulator in the reference direction. The optical fiber 41 bends backwards in the opposite direction in the housing 8 of the optical modulator and inputs light to the substrate 1 from the upstream side in the reference direction. The modulated light having the wavelength $\lambda 1$ is output to the optical fiber 42 present on the downstream side of the substrate 1 in the reference direction. The optical fiber 42 bends backwards in the opposite direction in the optical modulator and is extracted from the upstream side in the reference direction toward the outside of the optical modulator. The optical fibers 41 and 42 may bend backwards on a modulator substrate on which the substrate 1 is mounted, may bend backwards on a waveguide substrate connected to the outside, or may bend backwards in a space optical system.

As described above, in the fourth example as well, similar to the third example, the disposition order of the modulation electrodes 3 and the bias electrodes 4a and 4b in the optical modulation region M1 and the disposition order of the modulation electrodes 3 and the bias electrodes 4a and 4b in the optical modulation region M2 are set to be opposite to each other. In addition, the direction in which the light having the wavelength $\lambda 1$ travels in the optical modulation region M1 and the direction in which the light having the wavelength $\lambda 2$ travels in the optical modulation region M2 are set to be opposite to each other.

In the above-described constitution as well, it is possible to unevenly dispose the modulation electrodes in the longitudinal direction of the substrate for each wavelength, and thus the arrangement of the wires of the modulation electrodes on the substrate becomes easy. Therefore, compared with constitutions in which the disposition order of the modulation electrodes and the bias electrodes is constant, it is possible to simplify and shorten the wires on the substrate, and thus an increase in the size of the optical modulator can be suppressed. In addition, it is possible to shorten the wires of the modulation electrodes on the substrate having a large loss, and thus the deterioration of radio frequency characteristics can be suppressed.

Hitherto, the present invention has been described on the basis of the examples, but the present invention is not limited to the above-described contents, and it is needless to say that the design can be appropriately modified within the scope of the gist of the present invention.

For example, one bias electrode may be disposed ahead of the modulation electrodes, and the remaining bias electrodes are all disposed behind the modulation electrodes or, conversely, one bias electrode may be disposed behind the modulation electrodes, and the remaining bias electrodes are all disposed ahead of the modulation electrodes.

As described above, according to the present invention, it is possible to facilitate the arrangement of wires of modulation electrodes on substrates in optical modulators that modulate light waves having different wavelengths independently from one another and suppress an increase in the sizes of optical modulators. In addition, it is possible to shorten wires of modulation electrodes on substrates having a large loss and suppress the deterioration of radio frequency characteristics.

What is claimed is:

1. An optical modulator comprising:
a first optical modulation region modulating light having a first wavelength; and
a second optical modulation region modulating light having a second wavelength being formed on a substrate having an electro-optic effect and side by side in a width direction of the substrate,
wherein each of the optical modulation regions has modulation electrodes and bias electrodes,
an order of the modulation electrodes and the bias electrodes in a longitudinal direction of the substrate is changed for each of the wavelengths,
the substrate is accommodated in a housing,
in the housing, an RF interface for the modulation electrodes and a DC interface for the bias electrodes are provided, and
the DC interface, the RF interface, and the other DC interface are arranged on one side surface of the housing in this order.

2. The optical modulator according to claim 1, wherein a direction in which the light having a first wavelength travels in the first optical modulation region and a direction in which the light having a second wavelength travels in the second optical modulation region are opposite to each other.

3. The optical modulator according to claim 1, wherein a first bias electrode and a second bias electrode are provided as the bias electrodes, and
an order of the modulation electrode, the first bias electrode, and the second bias electrode in the longitudinal direction of the substrate is changed for each of the wavelengths.

4. An optical modulator comprising:
a first optical modulation region modulating light having a first wavelength; and
a second optical modulation region modulating light having a second wavelength different from the first wavelength being formed on a substrate having an electro-optic effect and side by side in a width direction of the substrate,
wherein the light having the first wavelength and the light having the second wavelength are input from a same side of the substrate,
each of the optical modulation regions has modulation electrodes and bias electrodes, and
an order of the modulation electrodes and the bias electrodes in a longitudinal direction of the substrate is changed for each of the wavelengths.

* * * * *